(No Model.)
J. W. PORCHER.
HORESESHOE.
No. 595,733. Patented Dec. 21, 1897.
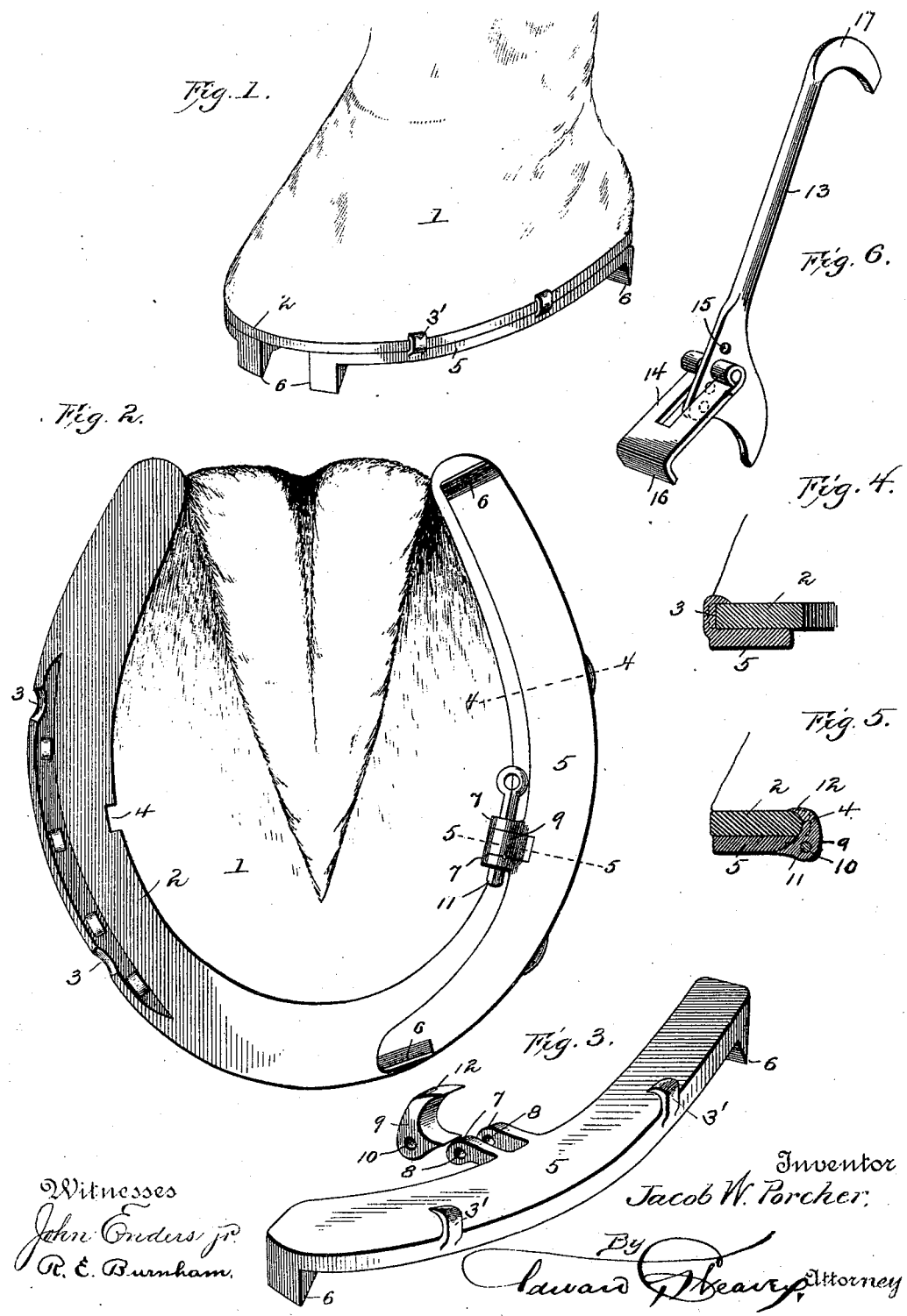
Witnesses
John Enders jr
R. E. Burnham
Inventor
Jacob W. Porcher
By Edward G. Heavy, Attorney

UNITED STATES PATENT OFFICE.

JACOB W. PORCHER, OF PORT WASHINGTON, OHIO.

HORSESHOE.

SPECIFICATION forming part of Letters Patent No. 595,733, dated December 21, 1897.

Application filed March 25, 1897. Serial No. 629,260. (No model.)

*To all whom it may concern:*

Be it known that I, JACOB W. PORCHER, a citizen of the United States, residing at Port Washington, in the county of Tuscarawas and State of Ohio, have invented certain new and useful Improvements in Horseshoes, of which the following is a specification, reference being had therein to the accompanying drawings.

My invention relates to horseshoes, and more particularly is an attachable and detachable portion thereof, whereby sharp calks may be secured to the ordinary shoe when the weather conditions so require.

In describing my invention I will make use of the accompanying drawings, in which—

Figure 1 represents a view of the shoe as attached to the hoof. Fig. 2 represents the appearance of the bottom of the shod hoof, one side of the shoe bearing the attachable calk-plate and the other not. Fig. 3 represents a calk-plate as separated from the shoe. Figs. 4 and 5 are partial sectional views on the lines 4 4 and 5 5, respectively, of Fig. 2. Fig. 6 is a view of a wrench.

In all of the figures the same numeral indicates the same part.

1 is a hoof, to which is secured in the usual manner a flat or calkless shoe 2, having the recesses 3 in the outer edges thereof and the recesses 4 on the inner edges.

5 is the calk-plate, of segmental form, with sharp calks 6 and the projecting hooks 3' adapted to fit in the recesses 3 and hook over the plate 1 at that point.

Integral to the plate 5 and adapted to register with the recess 4 are the pintle-lugs 7, with holes 8. A hook-dog 9 is inserted between the lugs 7 in such manner that its hole 10 registers with the holes 8, and a pintle-pin 11 engages the dog 9 with the lugs 7 in such manner that the hook 12 of the dog 9 fits in the recesses 4 and hooks over the plate 1, thus securing the plate 5 firmly in position.

To facilitate the withdrawal of the pins 11 and disengage the dog, I have devised a wrench of peculiar construction, comprising a handle 13, a hook-plate 14, pivoted at holes 15, the hook 16 thereof, and the hook 17 of the said handle.

Having described my invention, what I claim as new therein, and wish to secure by Letters Patent, is—

In combination with a shoe having the recesses 3 and 4 in the edges thereof, the calk-plate with the hooks engaging recesses 3 and the said shoe, the pintle-lugs on said plate, and the hooked dog engaging the recess 4 and the shoe and pivoted to the pintle-lugs by a pin, substantially as described.

In testimony whereof I affix my signature in presence of two witnesses.

JACOB W. PORCHER.

Witnesses:
CHARLES KRIEGER,
C. A. HAUPERT.